June 24, 1924.
J. T. AUSTIN
1,499,140
MANUFACTURE OF PERAMBULATOR WHEELS AND THE LIKE
Filed Oct. 11, 1923    3 Sheets-Sheet 1
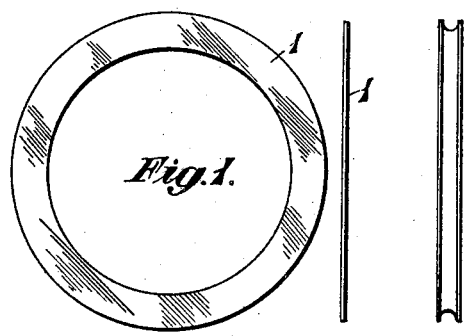
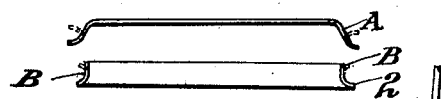
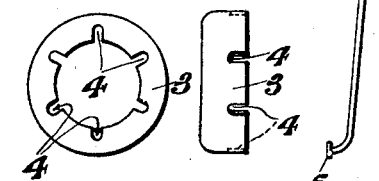
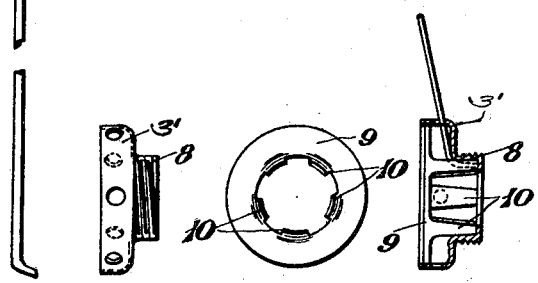
INVENTOR
John T. Austin,
BY Bright & Bailey
Attys June 24, 1924.

J. T. AUSTIN 1,499,140

MANUFACTURE OF PERAMBULATOR WHEELS AND THE LIKE

Filed Oct. 11, 1923    3 Sheets-Sheet 2

INVENTOR
John T. Austin,
BY Bright & Bailey
Attys.

June 24, 1924.

J. T. AUSTIN 1,499,140

MANUFACTURE OF PERAMBULATOR WHEELS AND THE LIKE

Filed Oct. 11, 1923  3 Sheets-Sheet 3

INVENTOR
John T. Austin,
By Bright & Bailey
Attys.

Patented June 24, 1924.

1,499,140

UNITED STATES PATENT OFFICE.

JOHN THOMAS AUSTIN, OF LONDON, ENGLAND.

MANUFACTURE OF PERAMBULATOR WHEELS AND THE LIKE.

Application filed October 11, 1923. Serial No. 667,928.

*To all whom it may concern:*

Be it known that I, JOHN THOMAS AUSTIN, subject of the King of Great Britain, residing at 7 Asteys Row, London, England, have invented new and useful Improvements in and Relating to the Manufacture of Perambulator Wheels and the like; and I do hereby declare the following to be a full, clear, and exact description of the invention, such as will enable others skilled in the art to which it appertains to make and use the same.

This invention relates to the manufacture of perambulator wheels, cycle wheels and the like and has for its object to provide a more efficient and durable structure of wheel than is produced under existing practice, and to enable it to be produced more cheaply. In existing practice the rim which accommodates the rubber tyre is made from a length of V or U section metal bent around a circular member and the ends welded together and the hub is made from a casting, the spokes connecting such hub and rim being threaded into the hub. By this method it is not possible to give sufficient tension to the spokes to enable them to resist bending under abnormal shock and strain and further owing to the hub being a casting it is liable to fracture.

According to the present invention a perambulator wheel, cycle wheel, or the like comprises a rim connected by spokes to a hub and is characterized in that the spokes are brought to the requisite tension by the interposition of a distance piece between two members to which the spokes are connected at their inner ends.

To ensure that there is no weak point in the rim so that the tension on the spokes is equally distributed it is preferred to manufacture the rim without a joint, the present practice with rims for perambulator, cycle or motor wheels having wire spokes being to make the rim from a length of channel shaped metal and to weld the two ends together. This welded joint is an undesirable feature in a wheel made according to the present invention as the tension on all the spokes is applied simultaneously during the manufacture of the wheels. In order to produce a rim economically of endless material, I prefer to make same from sheet metal, this being effected by stamping or spinning up a rim from the periphery of a flat metal disc, so that the disc presents the appearance of a shallow circular tray, and then subsequently to cut out the major portion of the disc concentric of this turned out portion and finally to spin or press up the resulting ring of metal into the completed rim. By this arrangement there need be no, or only a negligible waste of metal as the cut out portion of metal can be treated similarly to the initial disc of metal thereby allowing a plurality of wheels of successively decreasing diameter to be made from one blank.

The hub is made up of several parts preferably pressed and drawn from plain sleeve like blanks, such parts comprising a main central sleeve or bearing bush which fits inside an outer sleeve or the like which acts as a distance piece between a pair of collars to which are connected the inner end of the spokes, the rims of such collars being spaced from the central sleeve and each formed with holes or slots for the reception of the inner ends of the spokes which are passed therethrough. The inner opposing rims of these collars after the spokes are attached thereto have interposed between them so as to tightly engage their edges an outer sleeve within which the bearing sleeve has a sliding fit. This outer collar is preferably flared outwardly into flanges at its outer ends the peripheries of such flanges being bevelled so as to provide a good surface to engage the said collars.

The spokes are made of small diameter metal rod, and according to one embodiment the inner and outer ends of the spokes are split for a short distance, the furcations of such split portions being opened out after being passed through the holes in the collars on the hub and holes in the rim. Alternatively the ends of the spokes instead of being split may be drilled axially and subsequently spun or pressed outwardly in the form of an eyelet like head, rivet head or like outward flaring. Or as further alternatives the spokes may have the appearance of split pins, the eye portions being engaged in the hub and the outer ends turned over through the rim. As a further modification the spoke may be made in such manner that one length of rod provides for two spokes by passing a portion of its median part around the rim and connecting its two ends to the hub.

The central sleeve of the hub is secured in position by having at one end a slightly enlarged annular abutment, and after the sleeve is positioned the other end is spun or otherwise turned over. Threaded upon the outer collar is the usual brass cap.

In assembling the wheel all of the spokes are connected to the rim at their outer ends and alternate spokes or alternate pairs or series of spokes are connected at their inner ends to the collars after the manner set forth, then the outer sleeve member is forced between the two collars so as to place the spokes under high tension subsequently the central sleeve or bush is inserted in the collars and outer sleeve and its projecting end spun over.

The usual lubricating hole may be bored through the outer and inner sleeves, and by slightly modifying the structural details hereinbefore set out ball bearings may be embodied in the hub.

In order that my invention may be clearly understood and readily carried into effect I have appended hereto three sheets of drawings illustrating same wherein:—

Fig. 1 is a series of views illustrating the initial step in the preferred method of manufacturing the rim.

Fig. 2 illustrates the completion of the second step, and

Fig. 3 represents a finished rim.

Fig. 6 shows in front and side elevation a spoke collar for use with the wheel in Figs. 4 and 5, and the inner end of a spoke for use therewith.

Fig. 7 shows in detail a modified construction of spoke collars.

The rim of my improved wheel is formed by spinning, pressing or otherwise turning the peripheral portion of a circular disk of sheet material laterally, as indicated at A in Figure 2 and at the same time curving outward such laterally turned portion as indicated at 2 in said figure until the peripheral portion of the disk resembles in cross section the letter J. The central portion of the disk then is cut away as indicated by Figure 1, leaving a ring 1 shaped in cross section like the letter J as aforesaid. Finally the straight cross sectional portion of such rim, constituting in effect the vertical limb of the letter J is spun or otherwise turned over to be symmetrical with the curved portion 2 of the cross section whereby a U-section rim Fig. 3 is provided, which when the spoke holes have been punched provides the completed rim ready to receive the rubber tire for a perambulator wheel or the like. If the rim is required for a cycle wheel the beaded edge may be spun or otherwise subsequently turned up therefrom.

Figure 4:
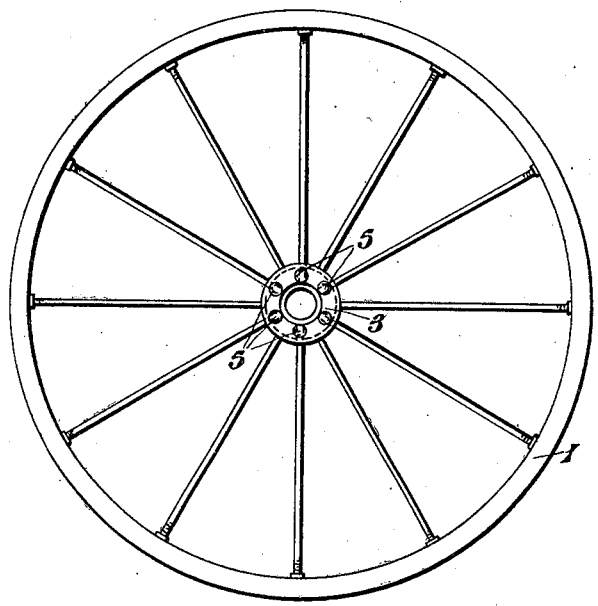
Fig. 4 is a side view of a wheel made according to the embodiment of my invention, but having the central bearing sleeve and cap omitted.
Figure 5:
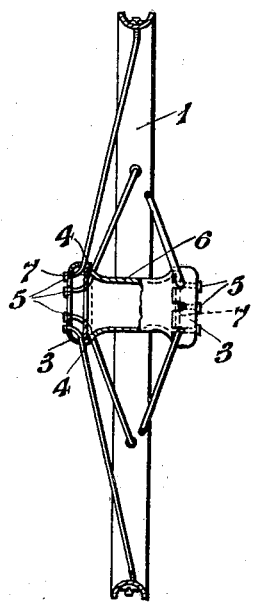
Fig. 5 is a bi-sectional end view of Fig. 4.

In Figs. 4, 5 and 6 is shown one form of hub according to my invention. In this construction the spokes are anchored to a pair of capped collars 3, the collars being slotted at both edges as at 4 for the reception of the inner ends of the spokes, the extremities of the spokes being formed with heads 5 adapted to abut against the outer faces of the collars. In constructing the wheel the inner ends of the spokes are connected as described to the collars 3 and the requisite tension to the spokes is effected by forcing a sleeve 6 between the two collars so that the flared ends of such sleeve reside just inside the inner edges of such collars, a pair of washers 7 being interposed between the cranked ends of the spokes and the outer ends of the sleeve 6. An axle bearing bush is finally inserted as a tight fit in the sleeve 6, and the end projecting beyond the outer face of the wheel is threaded in known manner for the reception of the usual cap or cone.

In Fig. 7 is shown a modified construction of hub collar. In this construction a cupped collar 3′ is provided having a concentric threaded portion 8 for the reception of the hub cap and a plurality of holes are provided in the periphery. Through these holes are passed the inner ends of the spokes, and such inner ends are held in correct radiating position by means of a washer 9 having a plurality of tongues 10 stamped up from its inner periphery, the spaces between these tongues providing accommodation for the beaded inner ends of the spokes. The sleeve 6 is interposed between the collars so as to apply tension to the spokes in the manner described in the preceding paragraph.

Figure 8:
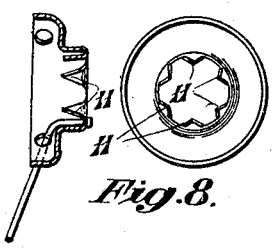
Fig. 8 is a further modification of spoke hubs.

Instead of using washers 9 having tongues turned up therefrom as above described the smaller periphery of the hub may have tongues 11 turned up therefrom as shown in Fig. 8 so that the cranked inner ends of the spokes will be held between these tongues.

Figure 12:
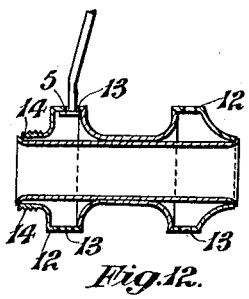
Figs. 12 and 13 illustrate the method of constructing one form of hub.

In Fig. 12 is shown a simple construction of hub according to this invention, and this hub comprises a pair of integrally formed outer collars 12 to which are connected the inner ends of the spokes by being passed through holes 13 and their ends turned over or beaded. One of these collars carries the threaded portion 14 for the reception of the axle cap.

Figure 13:
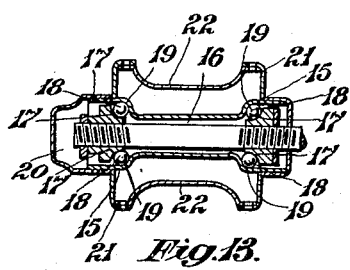

In Fig. 13 an axle similar to that shown in Fig. 12 is illustrated having ball bearings. The balls are accommodated in the enlarged ends of the tube 15 through which passes the axle 16 which in known manner carries the outer races 17 for the balls 18, inner races 19 being provided on the tube 15 as in common practice. An axle cap 20 is threaded on to the outer end of the tube 15. The collars 21 to which the inner ends of the spokes are attached are mounted on the tube 15 and spaced apart by a distance piece 22.

Figure 9:
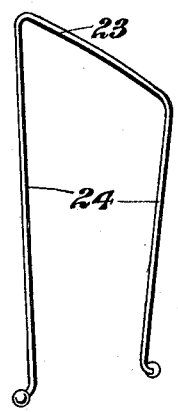
Fig. 9 shows a modified means of making spokes.

Instead of all of the spokes being separate elements as hereinbefore described they may be made as shown in Fig. 9 in which one length of rod or wire is provided for two spokes, the intermediate portion 23 being adapted to reside tightly against the outer surface of the rim, the limbs 24 constituting a pair of spokes being passed through holes in the rim and connected at their ends to the hub.

Figure 10:
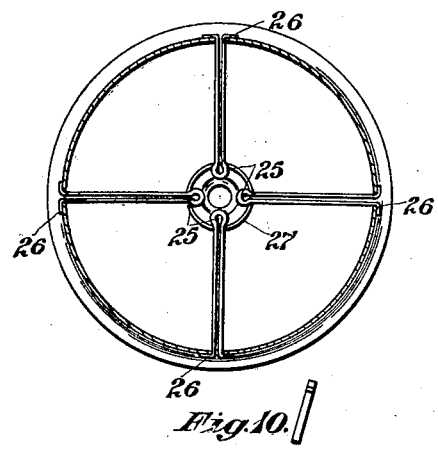
Figs. 10 and 11 illustrate a modified construction of wheels.
Figure 11:
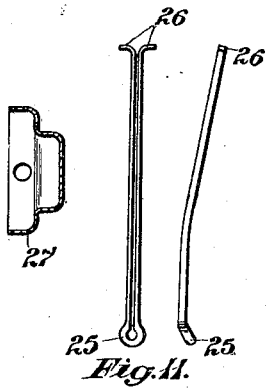

A further modification of spoke is shown in Fig. 10 in which each spoke is eyeletted by an elongated split pin the eyeletted end 25 providing the abutment to engage inside the hub, and the outer end having each limb cranked over as at 26 to provide the abutment in the rim. One of the spokes and a suitable form of hub collar 27 in section for use therewith are shown in Fig. 11.

Figure 14:
Fig. 14 is a perspective illustrating a modified form of spoke.

A still further modification of spokes particularly suitable for use with my invention is shown in Fig. 14, and comprises a length of rod or wire 28 split at its extremities, the furcations thus provided being bent over as at 29 to provide the rim and hub abutments.

Preferably the sleeve like elements and the collars for the hubs are pressed from the sheet metal, so that portions of sheet metal not large enough to provide rims can be employed for making the hubs, thereby obviating any appreciable wastage of material.

It will be apparent from the foregoing that provided the length of the spokes is accurately predetermined for any selected diameter of wheel no adjustment will be necessary once the wheel is assembled, the spokes all automatically being drawn simultaneously under the requisite tension. Further as the rim is made from endless material cut to a tube circle no adjusting of the spokes will be necessary to bring the rim true as in existing wire spoke wheels, especially cycle wheels.

A great economy in material and skilled labor is possible in the construction of wheels made according to this invention, and in the case of perambulator wheels an appreciably lighter and enormously stronger wheel is obtained.

What I claim is:—

1. A wheel comprising a rim, spokes and a hub, the hub including a pair of spaced collars provided with openings through which the inner ends of the spokes pass into the collars, and means within the collars separate from the spokes and movable endwise of the hub acting to hold the inner ends of the spokes against outward movement through the openings in said collars.

2. A wheel comprising a rim, spokes and a hub, the hub including a pair of spaced collars provided with openings through which the inner ends of the spokes pass into the collars, and means within the collars separate from the spokes and movable endwise of the hub acting directly against the spokes to hold their inner ends against outward movement through the openings in said collars.

In witness whereof I have signed this specification in the presence of two witnesses.

JOHN THOMAS AUSTIN.

Witnesses:
 TERENCE O. HUGHES,
 KITTY WELCH.